(12) United States Patent
Dorsten et al.

(10) Patent No.: US 8,357,412 B2
(45) Date of Patent: Jan. 22, 2013

(54) STORAGE AND PACKAGING OF BULK FOOD ITEMS AND METHOD

(75) Inventors: Ron Dorsten, Glenview, IL (US); Bruce G. Feinberg, Batavia, IL (US); James C. Purgatorio, Woodridge, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 0 days.

(21) Appl. No.: 13/199,997

(22) Filed: Sep. 15, 2011

(65) Prior Publication Data
US 2012/0009309 A1 Jan. 12, 2012

Related U.S. Application Data

(62) Division of application No. 11/413,233, filed on Apr. 28, 2006, now Pat. No. 8,051,795.

(51) Int. Cl.
*A23L 1/217* (2006.01)
(52) U.S. Cl. ........................................ 426/231; 426/289
(58) Field of Classification Search .......... 426/438–439, 426/233, 243, 248, 231, 232, 289; 99/409, 99/407, 403; 118/29, 30, 308, 13, 24; 414/287, 414/327, 419; *A23G 3/00; A23L 1/217*
See application file for complete search history.

(56) References Cited

U.S. PATENT DOCUMENTS

| 651,977 | A | 6/1900 | Rose |
| 2,138,967 | A | 12/1938 | Harris |
| 3,047,329 | A | 7/1962 | Gunderson, Jr. et al. |
| 3,274,920 | A | 9/1966 | Benson |
| 3,430,553 | A | 3/1969 | Di Pietro |
| 3,474,726 | A | 10/1969 | Curtin |
| 3,645,196 | A | 2/1972 | Johnston et al. |
| 3,871,739 | A | 3/1975 | Poulsen |
| 3,982,206 | A | 9/1976 | Poulsen |
| 4,922,435 | A | 5/1990 | Cahlander et al. |
| 5,006,355 | A | 4/1991 | Stuck et al. |
| 5,104,002 | A | 4/1992 | Cahlander et al. |
| 5,132,914 | A | 7/1992 | Cahlander et al. |
| 5,134,263 | A | 7/1992 | Smith et al. |
| 5,167,986 | A | 12/1992 | Gordon |
| 5,172,328 | A | 12/1992 | Cahlander et al. |

(Continued)

FOREIGN PATENT DOCUMENTS

GB 2337191 A 11/1999

(Continued)

OTHER PUBLICATIONS

International Searching Authority, International Search Report and Written Opinion, International Application No. PCT/US07/09201 Aug. 13, 2008.

*Primary Examiner* — Steven Leff
(74) *Attorney, Agent, or Firm* — Ryndak & Suri LLP

(57) ABSTRACT

A semi-automated food processing station, system and method is provided that allows food to be dispensed, stored and packaged in a suitable container, which may be an individual portion-sized container for serving to a customer. In one embodiment, the system includes an automated salting device, and may include a pivotable food receiving tray that automatically transfers the food items to one or more storage bins, where an infrared heater maintains the temperature of the food items by directing infrared radiation thereon. In a preferred embodiment, the infrared radiation passes through a filter that filters out the wavelengths of infrared radiation that may be irritating to an operator.

20 Claims, 6 Drawing Sheets

U.S. PATENT DOCUMENTS

| | | | |
|---|---|---|---|
| 5,173,811 A | 12/1992 | Gumbs | |
| 5,183,997 A | 2/1993 | Lotz | |
| 5,676,042 A | 10/1997 | Sakuma et al. | |
| 5,702,626 A | 12/1997 | Kim | |
| 5,998,316 A | 12/1999 | Seto et al. | |
| 6,018,146 A | 1/2000 | Uzgiris et al. | |
| 6,031,208 A | 2/2000 | Witt et al. | |
| 6,069,345 A | 5/2000 | Westerberg | |
| 6,296,004 B1 | 10/2001 | Gordon | |
| 6,399,879 B1 | 6/2002 | Ueda et al. | |
| 6,510,346 B2 | 1/2003 | Gordon | |
| 6,550,373 B2 | 4/2003 | Hafezan et al. | |
| 6,718,561 B2 | 4/2004 | Dondero | |
| 6,869,633 B2 | 3/2005 | Sus et al. | |
| 6,910,729 B2 | 6/2005 | Kraenzler et al. | |
| 7,107,123 B2 | 9/2006 | Watanabe et al. | |
| 7,303,776 B2 | 12/2007 | Sus et al. | |
| 7,343,719 B2 | 3/2008 | Sus et al. | |
| 7,356,980 B2 | 4/2008 | Sus et al. | |
| 2001/0032838 A1 | 10/2001 | Kim et al. | |
| 2002/0145859 A1 | 10/2002 | Chubb et al. | |
| 2003/0000395 A1 | 1/2003 | Hafezan et al. | |
| 2003/0205028 A1 | 11/2003 | Sus et al. | |
| 2004/0020915 A1 | 2/2004 | Shei | |
| 2004/0058094 A1 | 3/2004 | Hones | |
| 2004/0245812 A1 | 12/2004 | Wang et al. | |
| 2005/0015862 A1 | 1/2005 | Dondero | |

FOREIGN PATENT DOCUMENTS

| | | |
|---|---|---|
| JP | 01-310617 A | 12/1989 |
| JP | 04-503887 T | 7/1992 |
| JP | U05-84090 | 12/1993 |
| JP | 10-075722 A | 3/1998 |
| JP | 2003-169623 A | 6/2003 |
| WO | WO 88/02999 A | 5/1988 |

STORAGE AND PACKAGING OF BULK FOOD ITEMS AND METHOD

CROSS-REFERENCE TO RELATED APPLICATION

This application is a division of U.S. application Ser. No. 11/413,233, filed on Apr. 28, 2006, pending, the entire disclosure of which is hereby expressly incorporated by reference.

BACKGROUND OF THE INVENTION

1. Field of the Invention

The invention relates generally to food processing of food items and, more particularly, to automated food processing, storing and dispensing of food items, such as at a quick-service type restaurant.

2. Background Art

In restaurants, especially quick-service restaurants, rapid, consistent, efficient and safe food preparation is essential for a successful operation. The quality of the prepared food depends in large part on the consistency of food preparation and storage. The food must be cooked using correct procedures and must be processed after cooking under appropriate conditions for the proper time.

Consistency in food preparation and storage times for cooked food items may vary as a result of many factors. For example, people engaged in food preparation often must perform multiple tasks at frequencies that vary with time because of constantly varying customer demand throughout the day. For example, lunchtime and dinnertime may be extremely busy while other periods may be relatively slow. The product mix can vary from hour to hour and day to day. As a result, the consistency and quality of food may vary. Difficulties in proper scheduling of food production during peak and non-peak periods can cause customer delays and/or stale, wasted or unusable food. Food preparation can be labor intensive, and thus, the labor cost can be a large portion of the total cost of the prepared food. Additionally, food items stored under conditions that maintain temperatures at an appropriate level often utilize infrared heat lamps that emit rays that may affect the comfort level of the employees.

Quick-service restaurants must be able to effectively meet a variable customer demand that is time dependent and not subject to precise prediction. As a result, stores relying totally on human operators performing their function at predetermined times will necessarily occasionally be overstaffed and at other times be under-staffed. Also, potential health and safety concerns can arise with the amount of direct contact of the operator with the food being prepared. By reducing or minimizing human contact with food and food cooking equipment, health and safety concerns can also be reduced or minimized. Any time or work savings that can be implemented will assist in maintaining consistency of food quality and with employer satisfaction with working conditions at higher levels.

Although quick-service restaurants have existed for many years and now number in the tens of thousands, such establishments utilize manual labor to prepare and process food. While there have been various improvements in commercial equipment used for cooking and processing cooked food in quick-service restaurants, such restaurants are believed to be substantially all manually operated and are relatively labor intensive.

Restaurants, and particularly the quick-service type of restaurant, depend upon quickly preparing, packaging and serving food in order to minimize customer waiting and to ensure freshness and quality of the food items when served to the customer. Equipment operators in a quick-service restaurant prepare food items, for example French fries, in bulk, typically tossing them from a fry basket into a holding or storage area. The bulk food items may then be salted by hand or with a handheld salting device that ensures a controlled portion of salt is delivered to the food items in the holding area. The salted food items are sometimes manually tumbled or agitated to distribute the salt amongst the food items, for example French fries. Cost and labor savings devices are desirable in the food preparation process. For example, automated salting, with a predetermined amount of salt, of a batch of bulk food items reduces the amount of manual time needed to prepare and serve the food items. Moreover, while some operator contact with the food is to be expected, certain operations and work stations that are automated so as reduce the need for human contact and attention will greatly alleviate some of these potential problems.

Non-uniform salting may result when done manually. Also, at times there is a delay between when the cooked French fries are delivered to the holding area and when they are salted, perhaps because the attention of the operator is diverted to performance of other tasks. While the French fries are sitting, they begin to cool, and when they are eventually salted, the adhesion of salt is poor. Other times, the holding area may not be emptied before another batch of cooked French fries is transferred into the holding area. When these freshly cooked fries are salted, the fries from the previous batch end up being oversalted.

A need exists for an apparatus and method for automating the preparation of seasoned food items, such as bulk salted French fries, wherein the work station, system and method further enhance the consistency of salting, and improve the overall distribution and adhesion of salt or other seasoning on the cooked food. Automation of other portions of the food processing operation is desirable to reduce the number of operational steps for which the operator is responsible during food processing. While these needs and desires exist for the preparation of salted French fries, it is also recognized that seasoning needs exist for any foods, breaded or non-breaded, which are prepared in-batch or individually and are subsequently seasoned, for example, but not limited to: other fried or cooked vegetables, chicken pieces or nuggets, shrimp, fish fillets and so forth.

Accordingly, a need exists for increased automation for a commercially suitable food dispensing and packaging device, system and method for fried foods that can be operated with a minimum of human intervention, attention and maintenance. More particularly, a need exists for a food packaging station, system and method that is capable of, without excessive human labor, processing food items where various food products in desired quantities, such as bulk French fries, are stored, and also for seasoning the cooked food items and packaging the cooked food items in individual portion-sized containers while simultaneously reducing the amount of manual labor.

Where such systems and work stations may be incorporated in restaurant establishments by retrofitting of existing equipment, this will improve the work environment of the restaurant while simultaneously providing food having more consistent quality while using significantly less manual labor.

SUMMARY OF THE INVENTION

In accordance with the present invention, a food processing station, system and method are provided. The food processing station, system and method in accordance with the invention allow food to be dispensed and packaged in a suitable container or, alternatively, dispensed to a food temporary holding or storage area for subsequent processing by a human operator.

In accordance with one aspect of the present invention, an operator station, system and method for processing, dispensing and packaging food into individual portion-sized containers are provided. In one embodiment, the system includes an improved manually transposed, but automatedly actuated, dispensing fry basket capable of dispensing a desired quantity of cooked food items to a packaging or storage area adjacent a cooking station where the cooked food items are packaged into individual portion-sized containers.

In accordance with another aspect of the invention, an optional automated seasoning device is present to apply seasoning to the bulk food items in a holding area freeing up the operator to perform another task.

The dispensing operation in accordance with the invention, in one embodiment, is capable of dispensing one or more of cooked French fries, chicken nuggets, hash browns, chicken patties, and fish filets or similar types of food items to be packaged while reducing operator contact with the food items.

In another embodiment, food is delivered from the fry vat to a cooked food holding and processing station, which can comprise a heated holding bin or bins. In one embodiment of the system, the heated holding bins are heated by infrared radiation heating lamps, including a protective shield for filtering out unwanted frequencies of electromagnetic radiation emanating from the infrared radiation lamps.

In accordance with another embodiment of the invention, the automated system further includes a carton holding bin for holding the individual portion-sized carton or container in a convenient position to be readily available to the operator, the container being able to receive bulk food items from the holding or storage area.

In one embodiment, the holding area may have one or more separations or bins to provide different food storage areas for holding the bulk food items so as to isolate the recently processed bulk food items from those of a previous batch, thereby to provide a first cooked, first out system, thereby limiting the instances of stale food items from being served to a customer.

In another embodiment of the invention, the food processing station comprises an automated seasoning device, having a hopper with a hopper opening; a seasoning dispensing drum positioned to receive seasoning from the hopper opening; and a pivotable food receiving tray positioned to receive seasoning from the seasoning dispensing drum.

In another embodiment, the dispensing drum has one or more grooves. The grooves facilitate supplying a pre-measured amount of seasoning to the batch of food items. The grooves are preferably designed to hold a certain predetermined amount or weight of seasoning depending on the amount of food expressed in a single standard batch. In one embodiment the drum rotates to the extent that one groove of seasoning is delivered to each new batch of bulk food items. Alternatively, if more seasoning is desired, the drum is capable of rotating to the extent that more than one groove of seasoning is applied to a particular batch of bulk food items. Additionally, an override control may be provided to produce a batch of unsalted food items for a customer order.

In still a further embodiment, one or more seasoning diverter rods are positioned between the seasoning dispensing drum and the food item holding area, typically a food receiving tray. The diverter rods divert the seasoning into a pattern that maximizes uniform distribution of seasoning. In one embodiment, seasoning diverter rods are positioned staggered above and below each other, which results in a dispersion pattern of seasoning to roughly mirror a rectangle of seasoning that matches the food receiving tray, and which evenly covers the food items on the food receiving surface of the moveable food receiving tray.

In still another embodiment, the automated food processing station and system has a pivotable food item receiving tray. When the tray is in the down position, the bulk food items are dispensed to a food receiving surface of the food item receiving tray. The food items may be placed on the food receiving surface of the tray manually, or may be delivered by an automated food preparation system. When the food is delivered to the moveable food receiving tray, the drum motor turns, typically so that one portion of seasoning transfers from a groove in the drum to the food items resting on the food item receiving tray. When the drum turns, another groove on the drum fills up with seasoning, for the next batch of food items. Once the food is seasoned, a tray motor rotates the pivotable food receiving tray to an inclined or nearly vertical position so that the seasoned food items slide or tumble off of the food receiving tray to a food storage or packaging area. Tumbling the food items into the packaging area further aids in the distribution of seasoning on the individual food items, for example, French fries in bulk. In one exemplary embodiment, the entire automated seasoning process requires less than 3 seconds to complete, and the process may be fully automated from the moment that the cooked food items are dispensed or delivered to the food receiving tray.

The automated seasoning device can be initiated to commence seasoning manually, for example, by placing the bulk food items on a food receiving tray or platform, such as a pivotable tray, and having the operator press an actuator button. Alternatively, the automated seasoning device can commence after initiating a sufficient amount of food items are sensed on the food receiving tray by an appropriate sensor. As a preselected amount of the food items is delivered to the food receiving platform, and a sensor senses the presence of cooked food therein.

The sensor may be any suitable structure, for example, a weight sensor, a load cell, an ultrasonic, optical, or other sensor, that is associated with the food receiving tray. The sensor will sense the presence of a batch of food items and with appropriate switching, a drum motor activates, whereby the food is seasoned, and a platform motor then activates to rotate the pivotable tray and deliver the seasoned food to the food packaging area, for example, a food item storage bin. The appropriate switching and circuitry to fully automate the automatic seasoning device are known to those skilled in the art, and a central processing and control unit may be utilized to receive and process the sensed signals and to generate the activation signals. If the automated seasoning device is automated, the control circuitry may provide an override switch to omit the automated seasoning for a particular batch of food items.

Another embodiment of the present invention comprises an automated salting device. The automated salting device includes a hopper with a hopper opening; a granular salt dispensing drum positioned to receive granular salt from the hopper opening; and a pivotable food receiving platform positioned to receive granular salt from the salt dispensing drum. In another embodiment, the rotatable drum of the automated salting device includes plural grooves. The automated salting device may further comprise a plurality of salt diverter rods positioned between the rotatable drum and the pivotable food tray. In still another embodiment, the rotatable drum of the automated salting device may be rotated by a drum motor controlled by the central processing and control unit. The pivotable food tray of an embodiment of the automated salting device further comprises a tray pivoting mechanism, which may include: a rotatable or pivotable food tray motor; at least one cam arm connected to and driven by the pivotable food tray motor; and at least one hinge block to allow for rotation. In yet another embodiment, the automated salting device further comprises a waste collection tray positioned to collect waste from the moveable transition tray. In still yet another embodiment, the automatic salting device includes a food storage bin or packaging area positioned to collect the seasoned food items from the pivotable tray, and temporarily store them for further processing by the operator.

The automatic seasoning device and the automatic salting device more evenly distribute the seasoning over the pivotable tray, so that the dispersion of the seasoning on the food items located on the pivotable tray is even and consistent throughout the food batch. Seasoning individual batches eliminates over-seasoning of previously seasoned batches. There is a labor savings, since seasoning occurs while the fry basket, for example, used for French fries in bulk, is being returned to the fry station instead of delaying the seasoning until after the fry basket has been returned to the fry station and the operator has returned to the food storage bins. In addition, there is better seasoning adhesion, for example, of salt to French fries, since the fries are salted so quickly after cooking and while they are still hot, the salt adheres to the fries more readily.

BRIEF DESCRIPTION OF THE DRAWING FIGURES

DETAILED DESCRIPTION OF THE INVENTION

In accordance with the present invention, an automated food processing system and method are described. The automated food processing system and method in accordance with the invention allow food to be processed and transferred to a food holding or storage area for subsequent processing by a human operator and packaging in a suitable container.

Figure 1:
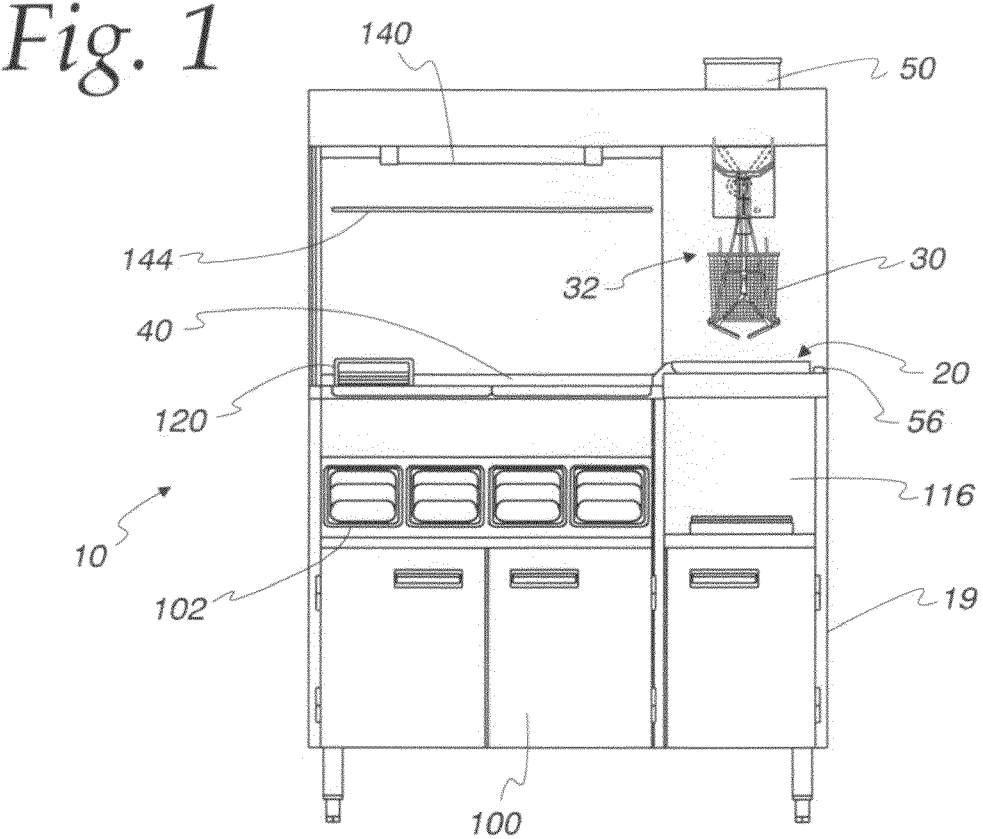
FIG. 1 is an elevational front view of an embodiment of a food processing station and system in accordance with the present invention.
Figure 2:
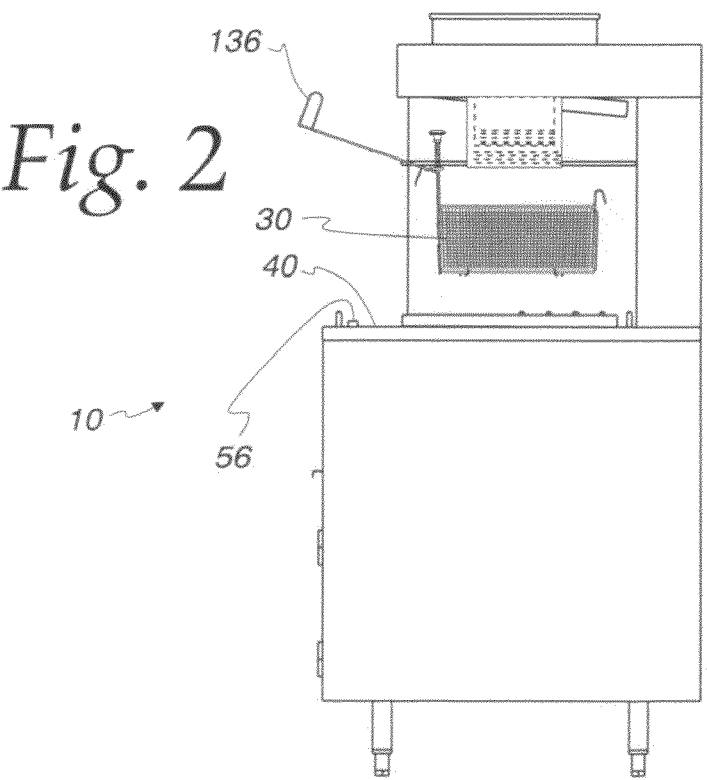
FIG. 2 is an elevational side view of an embodiment of a food processing station and system in accordance with the present invention.
Figure 3:
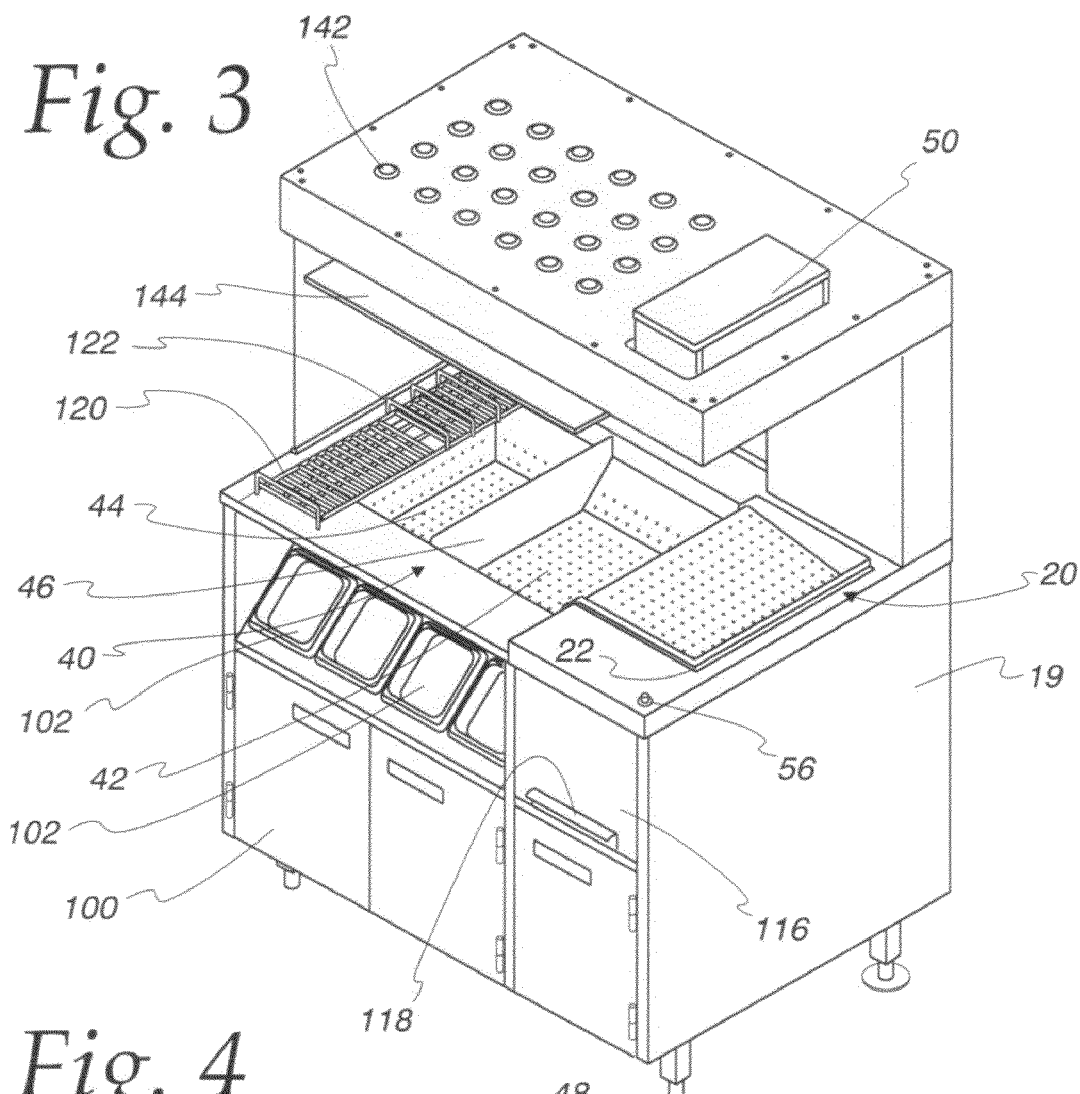
FIG. 3 is a perspective view of an automated food processing station in accordance with the invention.

Referring to the figures generally and in particular to FIGS. 1 through 3, there are illustrated an elevational front view, side view and perspective view of an automated processing station and system 10 in accordance with the invention. Automated food processing system 10 includes a food processing or preparation station comprising a food receiving tray 20 that receives cooked food items from, for example, a fry vat that deep fries food items, either in bulk, e.g. French fries, or individually, e.g., fish fillets. The fry vat may be conventional, and the fry baskets used to cook the food in the fry vat may also be conventional. Alternatively, the fry basket may have a structure similar to the fry basket described in commonly owned U.S. patent application Ser. No. 11/413,870, now U.S. Pat. No. 7,775,156, issued Aug. 17, 2010, or may have other configurations. The inventive station and system described herein are not necessarily dependent on the construction of the fry basket, but certain features of the inventive food processing station and system may be utilized, as will be described below, with any conventional or inventive fry basket.

The method generally used in processing cooked food items may also be used with the present invention. To provide a more readily understood explanation, the following description will emphasize cooked French fries in bulk as the food items, although it should be understood that a variety of other food items may be processed in the inventive station and system.

The cooking process, e.g., French fry deep frying process, is not a critical part of the present invention, except that following the completion of cooking, and after the excess oil has been drained or otherwise removed from the cooked food items, but before the food items have cooled, the food items are dispensed to a food preparation or processing portion of the system, for example, food receiving tray 20. As shown in FIG. 1, a fry basket 30 is shown with a dumping mechanism 32 partially open, to permit the French fries to be dumped on to the tray 20 out of the bottom of the fry basket, as described in the aforementioned U.S. patent application Ser. No. 11/413,870, now U.S. Pat. No. 7,775,156, issued Aug. 17, 2010.

The other elements of the food processing station 10 include a food storage area, or food storage bins, 40, a seasoning mechanism 50, described in more detail with reference to FIG. 8 below, and a heat source 140 for maintaining the food items in the storage area 40 at an appropriate temperature prior to serving. Additionally, storage cabinets 100 located below the work surfaces of the station 10 may provide appropriate storage space for equipment or packaging supplies. For providing easy access to such packaging supplies, quick access bins 102 may be disposed above the supplies stored in the station 10. One of the quick access bins 102 may contain a first size of French fry packaging, another a second size, and a third bin may contain a different type of packaging supplies, for example, a small paper sack for packaging fish fillet sandwiches or other food items. While four bins 102 are shown in FIGS. 1 and 3, any number of such bins 102, from 2 to 10 or even more, may be provided, depending on the variety of food items that may be processed through the station 10.

After the cooked food items have been deposited or dispensed into the food receiving tray 20, the cooked food items need to be seasoned and provided with a short cooling off period whereby the seasoning, for example, salt, adheres to the food items. Care is taken to evenly distribute the seasoning over the food items. Optionally, the tray 20 may be attached to a shaking mechanism to assist in the even distribution of salt, but because of its shape and configuration, the seasoning mechanism 50 provides extensive distribution of the salt or other seasoning over the surface area of tray 20. The seasoning mechanism 50 is preferably provided in an automated construction that minimizes the amount of manual labor necessary to complete the seasoning process.

An exemplary embodiment of an automated seasoning mechanism device 50 is illustrated in FIG. 1 and described in greater detail with reference to FIG. 8. The seasoning mechanism 50 comprises a seasoning hopper 52 that is configured to contain the seasoning, for example, salt. The hopper 52 may include any structure that holds seasoning prior to its application to food items. The hopper 52 can optionally further comprise a hopper cover or housing 54, shown in partial cutaway view in FIG. 8. The hopper 52 can be made from a plastic material, such as, but not limited to, molded polyethylene, a metal, for example, stainless steel, or any other suitable material for holding seasoning. The housing 54 may comprise sheet metal or may be constructed from any material capable of supporting the various components of the automatic seasoning mechanism 50 and also withstanding for long periods the elevated temperatures reached in the food processing station 10.

The embodiment of FIG. 1 may comprise an actuation button 56 to start the seasoning process, or alternatively, an automated actuating sensing device 28 (see FIG. 9) may be associated with the food receiving tray 20. Sensing device 28 sends a signal to a central processor, which automatically starts the seasoning process when food of a predetermined weight is placed on the food receiving tray 20. Suitable sensing and actuating devices are known to those skilled in the art and include, without limitation, weight sensors, such as a scale or load cell, or ultrasonic or optical detectors, or other sensing devices. Alternatively, the button 56 may be used to override the automated seasoning process and to omit the seasoning step pursuant to the customer's order.

Figure 8:
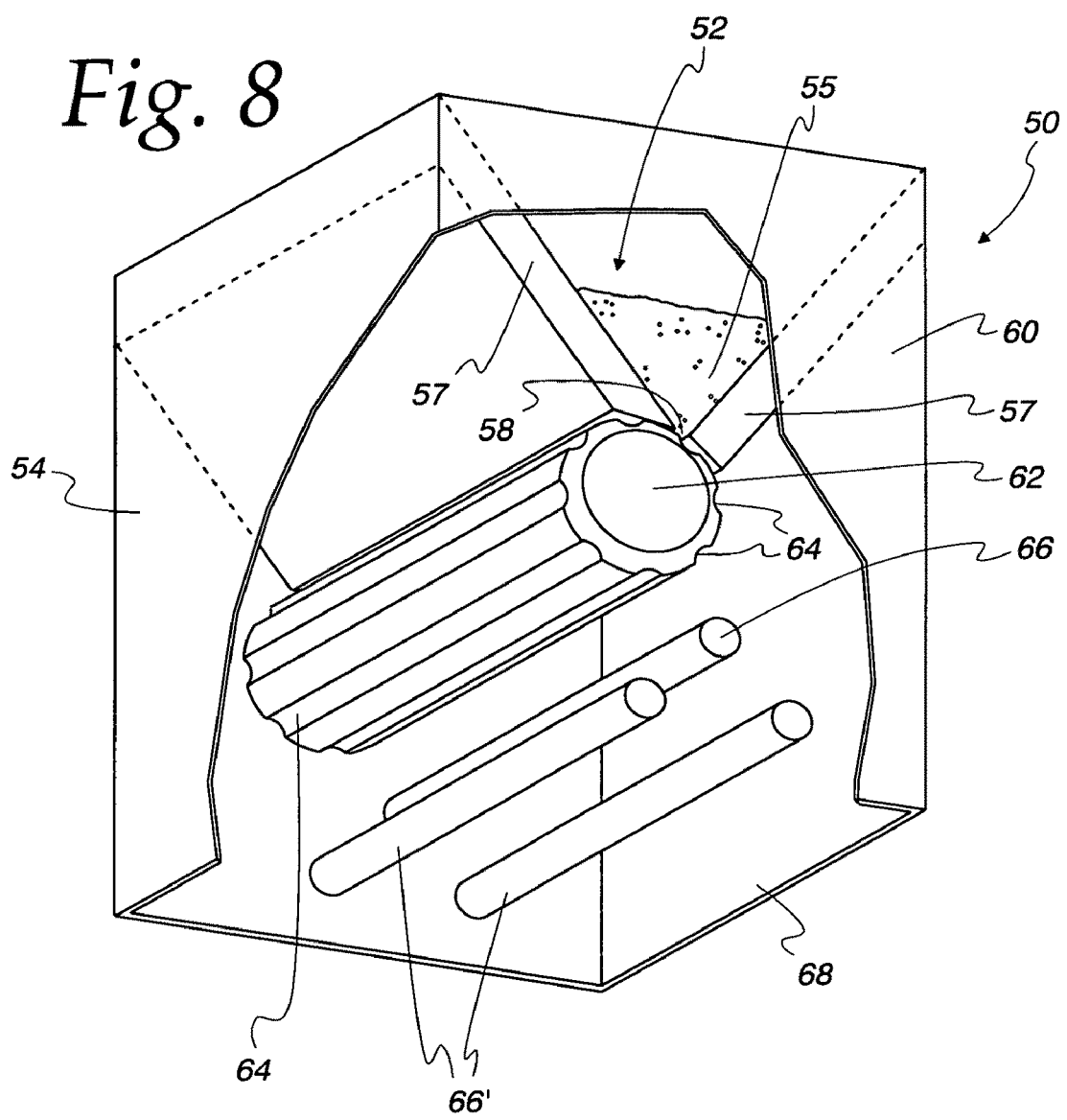
FIG. 8 is a detailed perspective view of the food item processing station showing an automated seasoning delivery system according to the present invention.

Now referring primarily to FIG. 8, details of the seasoning hopper 52 of an embodiment of an automated seasoning device 50 become more apparent. Referring to FIG. 8, the hopper 52 may include one or more angular walls 57 that are sloped toward a hopper opening 58 to direct seasoning, such as granular salt 55, contained in hopper 52 into the opening 58.

One embodiment of a hopper 52 as depicted in FIG. 8 comprises at least one side wall 60 that is constructed from a transparent or semi-transparent solid material, such as for example, but not limited to: molded polyethylene; polystyrene; or polymethyl methacrylate (PMMA)—more commonly called acrylic glass or simply acrylic. A degree of transparency for a side wall 60, or other hopper wall, is a desirable, but not necessary, feature in that it renders visible to a user the amount of seasoning 55 in the hopper 52. When the operator notes that the seasoning 55 is depleted, the need to recharge the hopper 52 with more seasoning 55 will be recognized.

Referring again to FIG. 8, a seasoning dispensing drum 62 is positioned to receive seasoning 55 from the hopper opening 58. In one embodiment, the seasoning dispensing drum 62 is rotatable. The seasoning dispensing drum 62 may be fabricated out of, for example, but not limited to, injection molded acrylonitrile butadiene styrene (ABS) or other appropriate material. The seasoning dispensing drum 62 preferably comprises one or more grooves 64. The grooves 64 may be angularly displaced from each other, relative to an axis of rotation of the drum 62. The grooves 64 may be designed to accommodate a predetermined or pre-measured amount of seasoning, for example, granular salt. The drum 62 may be rotated by a drum motor (not shown), which may be an electric motor, a battery operated motor, or any other type of motive device that is known to one skilled in the art and that is capable of rotating the drum 62. The drum motor is preferably of the stepping-type of motor, which turns the drum 62 through a pre-specified angle of rotation for each actuation of the drum motor 62. For example, the drum motor may be set to rotate the drum 62 to the extent that one groove 64 of the drum is advanced and to deliver the predetermined amount of seasoning for each actuation. Alternatively, the drum motor could rotate the drum 62 so that several drum grooves 64 are advanced to increase the portion of seasoning delivered to the food items on the food receiving surface of the food receiving tray, depending on the desired amount of salt or seasoning.

Adjacent to the underside of the seasoning dispensing drum 62, one embodiment of the invention may comprise one or more seasoning diverter rods 66. The diverter rods 66 may be positioned in a staggered arrangement above and below each other. In one embodiment, a diverter rod 66 is positioned so that the seasoning is dispensed from the rotatable seasoning dispensing drum 62, and immediately comes into contact with the first diverter rod 66. The seasoning is then deflected into two seasoning streams which because of the circular profile of each diverter rod 66, is a larger or more angularly spaced stream after the deflection than the original stream. Two more diverter rods 66' may be positioned below and offset enough from the first diverter rod 66, closest to the drum 62, so that the streams of seasoning each deflect once more from one of the offset diverter rods 66'. This results in at least four streams of seasoning being dispensed from the open bottom 68 of automated seasoning mechanism 50. The arrangement of the diverter rods 66, 66' provides a more even distribution of seasoning in an essentially rectangular pattern. It is further recognized that other arrangements of diverter rods 66, 66' are possible. The embodiment described is exemplary and this disclosure recognizes and encompasses alternative seasoning mechanism arrangements of diverter rods that may provide the necessary function of dispersing the seasoning 55.

Figure 4:
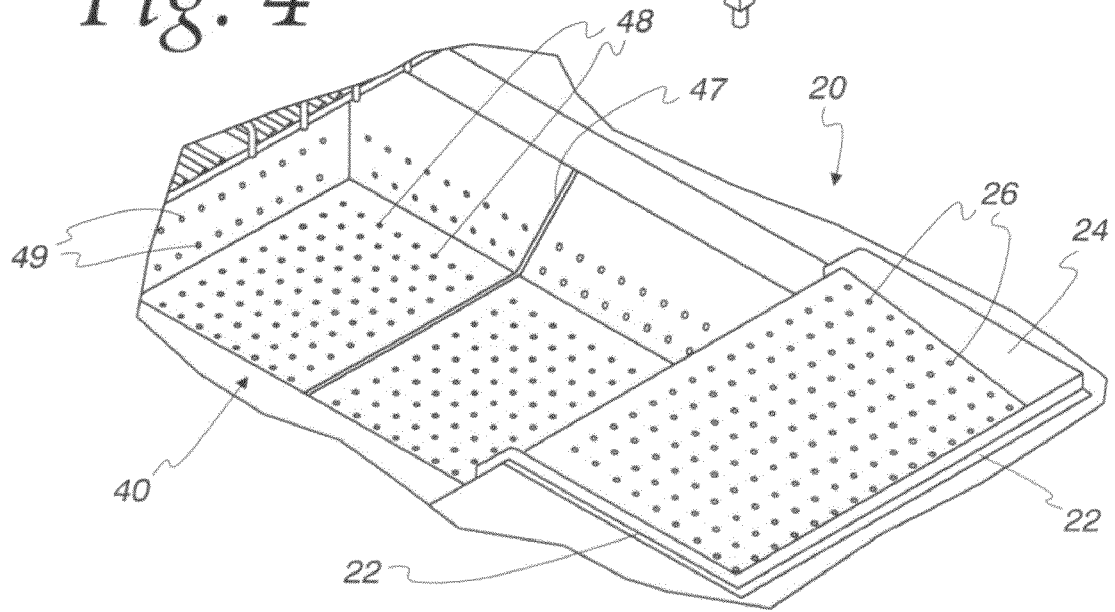
FIG. 4 is a fragmentary view of a portion of another embodiment of the food item storage bin in accordance with the present invention.
Figure 9:
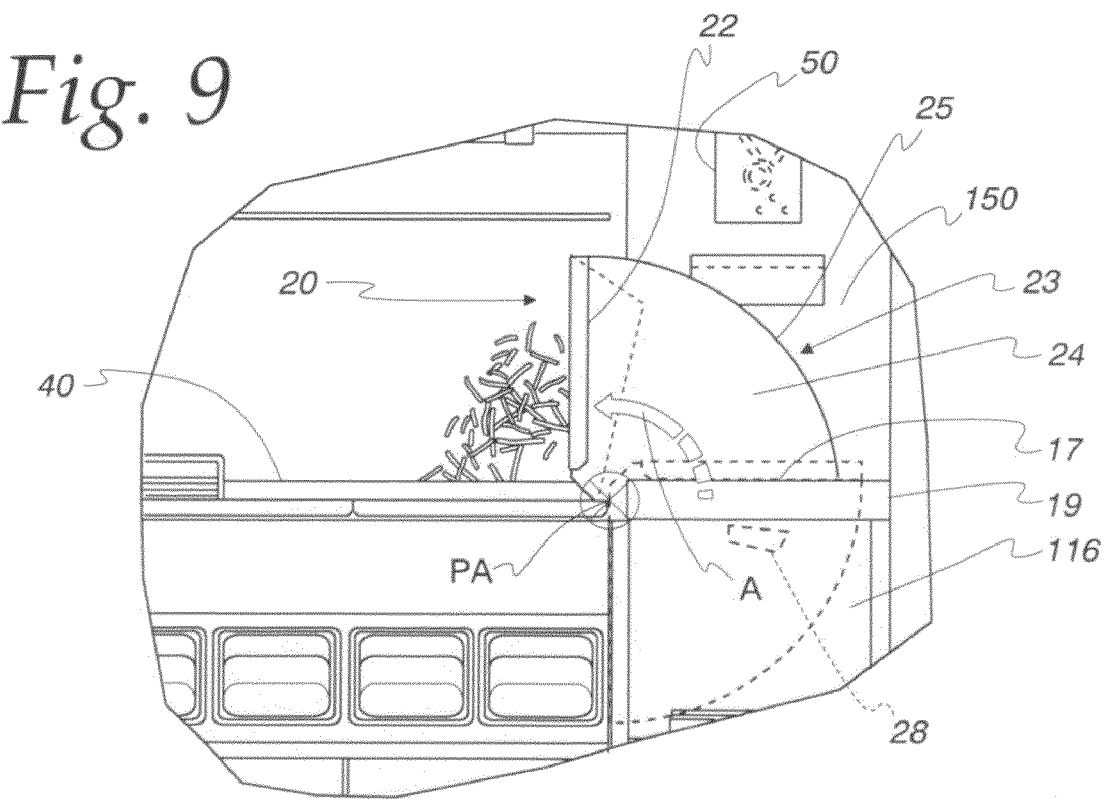
FIG. 9 is a cutaway front view of the food item transfer mechanism, in operation, according to the present invention.

Referring now primarily to FIGS. 3, 9, and to FIG. 4, wherein a detailed view is shown of the pivotable food receiving tray 20. The perspective view of FIG. 3 shows the pivotable tray 20 in the loading position (relatively horizontal), while the view of FIG. 9 shows the pivotable tray 20 after it has been pivoted into the unloading position (relatively vertical). Any suitable mechanism may be employed to pivot tray 20 between the relatively horizontal and vertical positions. In the embodiment shown in FIGS. 3 and 9, the pivotable food receiving tray 20 is powered by a tray motor (not shown) internally disposed adjacent the tray pivoting axis PA. The pivoting apparatus further may include a cam arm (not shown) and at least one hinge block (not shown), disposed beneath the tray 20.

The rotatable transition tray motor preferably drives the cam arm and together with the hinge block enables the food receiving tray 20 to rotate about the pivot from a down, near horizontal, food receiving position, as shown in FIG. 3, to an up, inclined, near vertical, food delivery position, as shown in FIG. 9. For convenience, the grouping of a tray motor, a cam arm, and at least one hinge block is referred to herein as a tray pivoting mechanism for reciprocally pivoting the tray 20 between these two positions. For a more detailed illustration and description of the pivoting mechanism, reference is made to commonly owned U.S. Pat. No. 5,172,328, issued on Dec.

15, 2002, the description of which is herein incorporated by reference, for both the structure and operation of the tray pivoting mechanism.

The food receiving tray 20 includes several features to provide safety during operation. As shown in FIG. 3, and in greater detail in the cutaway detailed view of FIG. 4, a flanged rim 22 surrounds the periphery of the food receiving tray 20. The flanged rim 22 is in a single plane and defines a periphery larger than the opening 17 (FIG. 9) of the station housing 19 into which the body of the food receiving tray 20 is inserted when it is in the down position as shown in FIG. 3, and in phantom in FIG. 9. The flanged rim 22 also covers any gap that may result between the tray body and the opening 17.

As best shown in FIG. 9, but referring also to FIGS. 3 and 4, the food receiving tray 20 further comprises a curved housing 23 that extends as a semi-cylindrical member from the flanged lip 22 down toward and into the opening 17. The tray housing 23 includes two vertical walls, one vertical wall 24 which is shown in FIG. 9, and a rounded rotating wall 25 that is integral to and pivots together with the food receiving tray 20 when the tray 20 is pivoted in the direction of arrow A. A second flanged lip (not shown) disposed at the opposite end of the curved wall 25 may be optionally included to provide a stop that limits the angle to which the food receiving tray 20 is permitted to pivot. The walls 24, 25 are shaped and dimensioned so that at all times during the pivoting of the food receiving tray 20 in the direction of arrow A, and during the return to the food loading position (FIG. 3), the gap between the opening 17 of housing 19 and the vertical walls 24 of the food receiving tray is at a minimum to inhibit objects or the operator's finger from being caught therein.

As is shown in FIGS. 3 and 4, the food receiving tray 20 is slightly inclined as viewed in the direction toward the pivot axis PA and the food storage bins 40, so that food deposited into the tray 20 will gravitate to the lowest point closest to the housing 19 (FIG. 3). The bottom of tray 20 includes a plurality of uniformly spaced apertures 26 that permit air passages to cool off the food items in the food receiving tray 20. Additionally, any stray bits of food or excess oil that may still be draining from the food items will also pass through apertures 26 and fall into a waste retrieval collector in a tray (not shown) in the cabinet drawer 116 of station housing 19. The cabinet drawer 116 may be opened by the operator pulling on handle 118, removing, emptying and replacing the tray and closing the drawer 116.

The waste collection tray (not shown) may be removable for easy cleaning. A rear waste collection wall (not shown) within the cabinet drawer may be curved or angled. Thus, any waste matter falling through the plurality of perforations 26 of the food receiving tray 20 will impact the rear waste collection wall or directly fall into the waste collection tray. Further, when the pivotable food receiving tray 20 is in the upright food delivery position (FIG. 9), waste matter that may have accumulated on the rear waste collection wall will be transferred directly into the waste collection tray in the drawer 116.

In an alternative embodiment, the pivotable food receiving tray may be constructed more closely in accordance with known automated food processing systems, for example, as is the pivotable cooked food dump mechanism that is described in aforementioned commonly owned U.S. Pat. No. 5,172, 328.

After the food is seasoned, food receiving tray 20 is pivoted to its generally vertical food delivery position so that the food items thereon slide or tumble into food storage area 40. In the embodiment shown in FIG. 3, food storage area 40 includes two separate bins 42, 44 separated by a vertically extending separating divider 46 that is shaped and dimensioned to fit within a correspondingly shaped groove 47 (FIG. 4) extending across the divide between the bins 42, 44. In some embodiments, in which the storage area 40 is intended to hold only one type of food item, e.g., bulk French fries, neither the divider 46 nor groove 47 is necessary. However, if the storage bins 40 are to hold different types of processed food items, for example, fish fillets or deep fried cheese sticks, in addition to French fries, and to maintain a separation so that food items do not mix, then one or more dividers 46 will be necessary. While a single divider 46 is shown in FIG. 3, it is to be appreciated that additional dividers may be introduced in the food storage bins 40 to accommodate a greater variety of food item types.

Alternatively, the divided bins 42, 44 may be used as a batch separator for providing the ability to the operator to move the previously processed batch of a single type of food item, for example, French fries, from bin 42 to bin 44. This configuration can isolate the food items that were cooked in a previous batch and have not yet been served for immediate packaging and serving. The previous batch of food items may be manually moved by the operator from bin 42 to bin 44, or alternatively, an automated device may move the previous batch prior to pivoting of food receiving tray 20. This first in, first out method of providing the food items to customers aids in the operator's desire to avoid serving any cold and stale food items that have been mixed in with a new batch of food items. The batch separator system maintains the consistency and freshness of the food items stored in the food storage area 40.

As can be seen from the more detailed cutaway view of the storage bin area 40 in FIG. 4, the walls and bottom of the bins 42, 44 also include a plurality of small apertures 48 that permit the food to be subjected to circulating air so as to retain freshness and flavor. Additional apertures 49 may be included in the vertical walls of food storage area 40. As in the structure of the pivotable food receiving tray 20, the apertures 48 are provided to permit any waste matter that is present in the food items, for example, broken off small pieces of food, that are not desirable to be served to customers, from accumulating in the food storage area 40. Of course, cabinets or drawers 100 located below the food storage bins 42, 44 may include trays to catch any waste matter that has fallen through the apertures 48, similar to that described with reference to drawer 116 above.

An individual food package rack 120 is disposed at the side of the food item processing station 10 opposite from the food receiving tray 20. Rack 120 is shown as comprised of a wire or metal rod mesh rack having spaces between the individual metal rods or wires 122 to keep the individual packages upright. If the food items comprise, for example, French fries, the operator can manually remove one individual package from the quick access bins 102, load it with food items from one of the food storage bins 42, 44, and place it within the wire rack 120 in a condition ready for serving to the customer.

An important feature of the automated station and system is to maintain product integrity and freshness. One facet of that is to move product that has exceeded its authorized holding time limit. The mechanical design of automated processing station and system 10 assures a substantially "first in-first out" product movement in that the operator can move the previous batch of cooked food items from bin 42 to bin 44, place a fresh batch of food into bin 42, and dispose of any food items that have been held in the storage bins for too long a time. It is possible that some food items in the storage area will have reached their time holding limit, but through proper operator training and scheduling of cooking procedures, this can be minimized.

As in most conventional food processing stations of this type, there is a heat source 140, which generally may include a plurality of heating lamps 142 (FIG. 3), that emit infrared (IR) radiation onto the food items in the storage bins 42, 44 and on rack 120 to keep the temperature of any food therein at an appropriate level until the food items are ready for serving and pickup by the customer. It has been noted that the radiation emanating from the heat lamps 142 may include wavelengths which may have an unwanted effect on the skin of an operator who is continually handling food items in the food storage area as a result of repeated exposure to the electromagnetic radiation. For example, the radiation may feel warm on the skin or may cause temporary redness of the skin.

Accordingly, to eliminate or reduce the impingement of electromagnetic radiation that may cause such effect on the operator, a filter 144, preferably comprising a heat glass shield, is interposed between the heat source 140 and the bins 42, 44 and the rack 120. Ideally, the radiation that is filtered out by shield 144 is those particular wavelength ranges that are known to cause tanning to some skin types, e.g., ultraviolet (UV) wavelengths, while permitting the IR wavelengths that provide for heating of the food items to penetrate through the filter 144.

The screen or filter 144 may comprise any suitable material, but a glass plate having entrained therein an appropriate additive that absorbs electromagnetic radiation in the range of the undesirable wavelengths is ideal. The electromagnetic spectrum range that is preferably filtered out by the filter 144 is in the wavelength range of from about 280 nm to about 380 nm.

In the alternative, a convective heat source (not shown) may be provided underneath food storage area 40 for heating the food contained in bins 42, 44 and on rack 120. This may be either in place of or in addition to heat source 140 located above food storage area 40. Suitable convective heat sources are known in the art.

Figure 5:
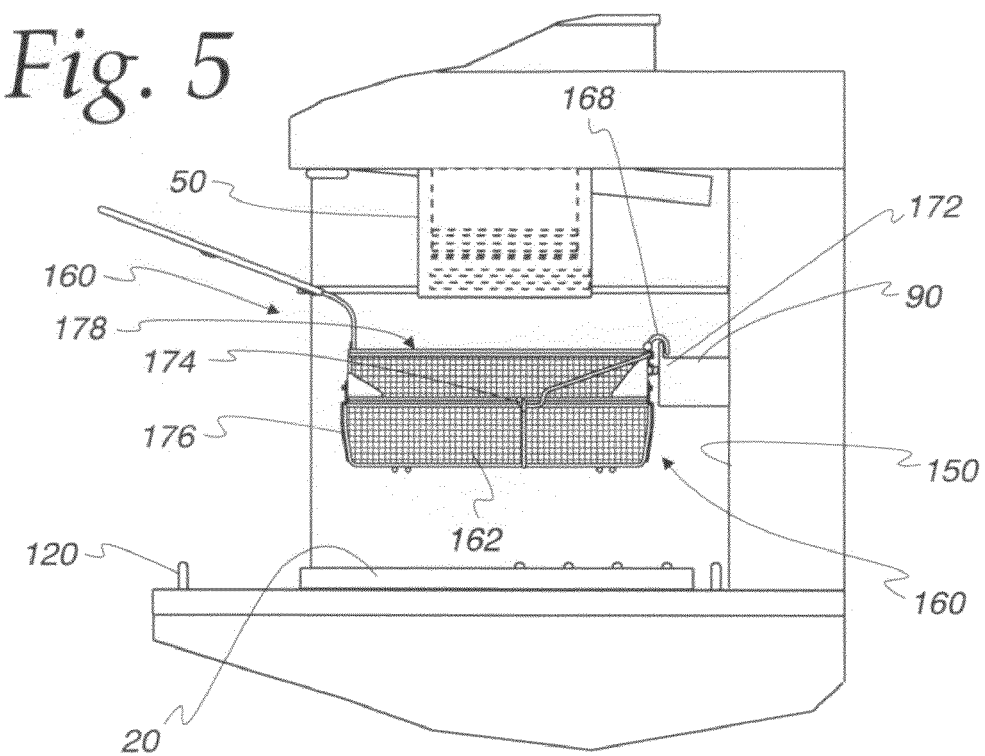
FIG. 5 is a cutaway detailed view of the cooked food item processing station showing an alternative fry basket and connection thereto in accordance with the present invention.
Figure 6:
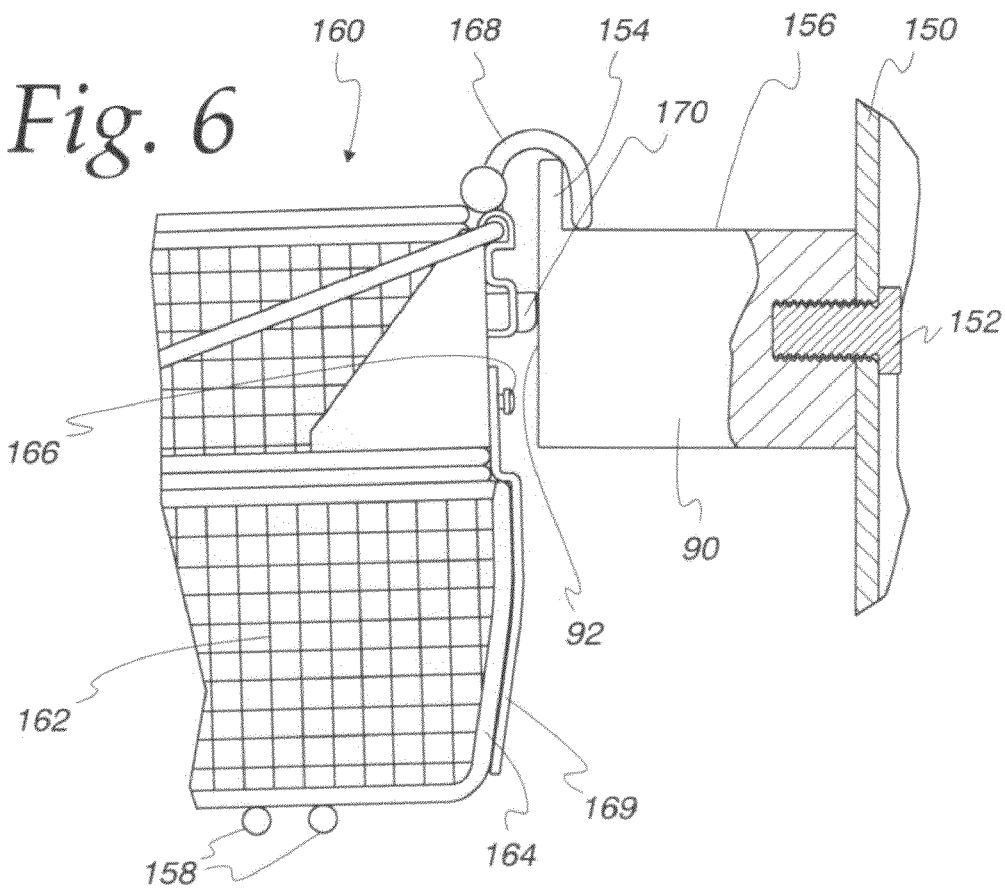
FIG. 6 is a cutaway view of another embodiment of the invention, showing the connection of the alternative fry basket attachment of FIG. 5.

Another embodiment for having an automated fry basket opening of the fry basket bottom is shown in FIG. 5, and in greater detail with respect to the triggering mechanism for opening the bottom, in the fragmented detail view of FIG. 6. In order to provide a retrofit capability to the mounting arrangement for mounting of the fry basket onto the back wall 150 of the food processing station 10, an alternate embodiment fry basket 160 has been developed. The alternative embodiment fry basket 160 has been constructed for mounting on a conventional mount such as those which are presently in use.

Figure 7:
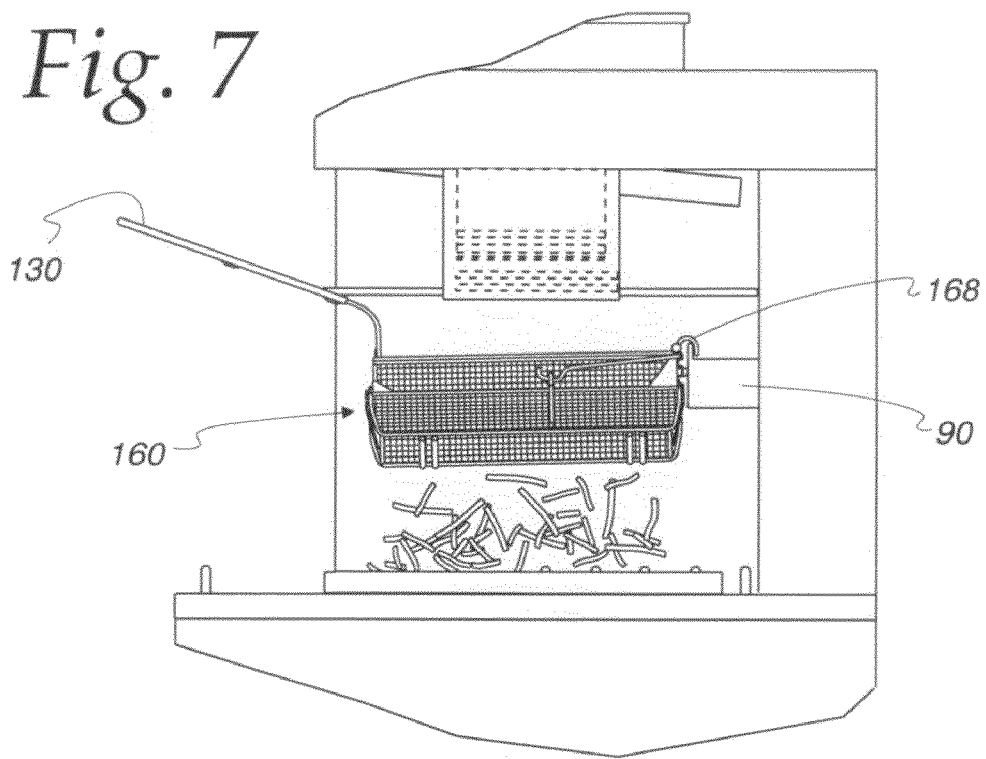
FIG. 7 is a side elevation view of one embodiment of the fry basket manually operable without an attachment according to the present invention.

A conventional mount 90 is shown attached to the back wall 150 of the housing of the food processing station by, for example, a bolt or screw connection 152. The conventional baskets may be mounted to an appropriate one of a plurality of the mounting brackets 90, one of which is shown in FIGS. 5, 6 and 7. The attachment mount 90 has an upper flange 154 which together with back wall 150 define a groove 156 onto which the hook 168 of the conventional or alternate embodiment fry basket 160 can attach. Attachment of the fry basket 160 by means of hook 168 being inserted into the groove 156 permits the basket to rotate about the hook connection so that a support flange combination can rotate around the connection. A pivot pin 166 may come to rest against an end surface 92 of the mount 90. With this configuration, the basket bottom 176, comprising wire mesh walls 162, wire support rods 164, 158 and a pivot lever 169, pivotably attached to pivot pin 166, permit two halves of the bottom portion of wire basket 160 to pivot outwardly. That is, when actuated by an automated depressing of an actuator button 170, the two halves of the basket bottom 176 are rotated out of and into the plane of the views shown in FIGS. 5 and 6, thus dumping the contents from the basket 160 onto the food receiving tray 20.

The alternative embodiment basket 160 further includes an actuator button 170 that is capable of actuating the dump mechanism 172 (FIG. 5) that opens a catch 174, which in turn triggers an opening of the fry basket bottom 176 by swinging or pivoting around an axis that is parallel to the longitudinal edge of the top portion 178 of the basket 160. The exact structure of dump mechanism 172 is not critical, and any of several key/latch structures are suitable. The common element in the available designs for the dump mechanism 172 is that the weight of the food items in the basket 160 causes the bottom to open by pivoting when actuated.

In the embodiment shown in FIGS. 5 and 6, the button 170 actuates a latch that holds two levers which retain the pivotable bottom of the fry basket 160 in the closed position. When the latch is actuated, the levers release the fry basket bottom 176, and the weight of the food items in the basket cause the dump mechanism 172 in the fry basket to open by pivoting about the pivot pin 166. Although shown in FIG. 5 prior to the activation, it should be understood that actuation is possible simply by the operator transferring the fry basket 160 over the food receiving tray 20 and mounting it on the bracket 90, thereby causing button 170 to trip the latch 174, which event automatically triggers the dump operation.

This operation will be repeated numerous times in the course of a mealtime rush, and consequently it is preferred that the mounting attachment 90 be made of a durable, easily cleaned material, for example, stainless steel, although other materials may also be found suitable to withstand the wear and tear of continuous and repeated use.

Referring now to FIG. 7, the fry basket 160 is shown in the open position in which the contents in the fry basket 160, in this case French fries, are in the process of being dumped onto the food receiving tray 20. In this embodiment, the operator dumps the contents by mounting the hook 168 onto the mount attachment 90 to actuate the opening of two bottom halves of the basket bottom 176 of the fry basket 160. In this embodiment, the fry basket handle is shown as a standard flattened handle 130, but the construction of the present invention described herein also permits using the forearm supports 136, as shown in the embodiment of fry basket 30 (FIGS. 1 and 2) and as described in detail in aforementioned U.S. application Ser. No. 11/413,870, now U.S. Pat. No. 7,775,156, issued Aug. 17, 2010.

After the dumping operation, the operator may withdraw either fry basket 30 or 160 to a mounting bracket at the fry vat station (not shown) disposed at the fry station above the fry vat. Of course, that mounting bracket at the fry station (not shown) must have a mechanism to avoid actuating the button 170 of the fry basket 160 so as to retain the basket bottom 176 closed, when the basket is draining the excess oil over the fry vat. As this mount must be completed without releasing the contents into the fry vat, such a mechanism may comprise, for example, an aperture on the mount at the height where the button that would impinge to provide an appropriate recess to house the button 170 without causing actuation. Alternatively, a wire rack mount (not shown) may be provided that has no vertical wall capable of depressing the button 170, thus maintaining the fry basket bottom 176 in the closed position.

Figure 10:
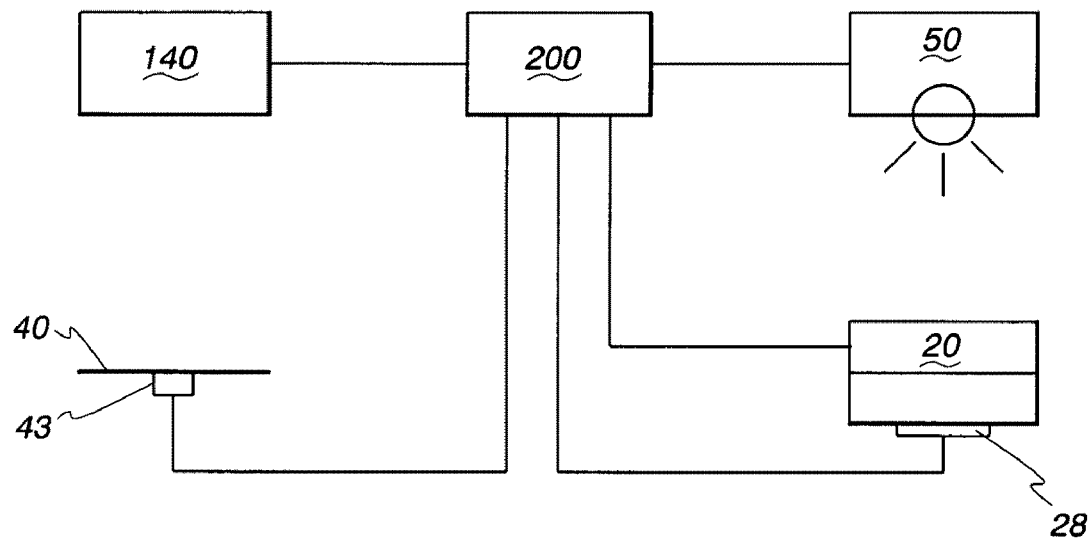
FIG. 10 is a schematic of a control system for the food processing system of the invention.

As shown in FIG. 10, all of the principal elements of the food processing system are preferably under automatic control of controller 200. Controller 200 may be a microprocessor or microcontroller based device such as a personal computer or, preferably, a dedicated controller. An example of a suitable dedicated controller is an Allen-Bradley Micrologix 1100 controller available from Rockwell Automatic of Milwaukee, Wis. Controller 200 may also be a computer, server or controller which operates other equipment in the restaurant. Controller 200 receives a signal from actuating sensing device 28 which is located under food receiving tray 20. Sensing device 28 may be a weight sensor, for example, a load cell, which outputs an analog weight signal which is input to controller 200. Upon receipt of a weight signal indicating that tray 20 is loaded with a predetermined weight of food, controller 200 sends a signal to seasoning device 50 to initiate the seasoning process for the food as previously described. Upon completion of the seasoning process, controller 200 sends a signal to the pivoting apparatus for food tray 20 to pivot food tray 20 to the essentially vertical position as described above.

Controller 200 also controls heating source 140 to maintain the proper temperature in food storage area 40. A temperature sensor 43 located in food storage area 40 (that is, in proximity to food storage bins 42, 44 and food package rack 120) sends a temperature signal to controller 200. In response to that temperature signal, controller 200 can turn heat source 140 on or off, or can vary the intensity of heat by, e.g., turning on or off one or more of heating lamps 142 in heat source 140, or varying the current supplied to heating lamps 142 to vary their heat output. Temperature sensor 43 may be any suitable sensor known in the art, such as a thermocouple or RTD.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

What is claimed is:

1. An automated method of processing cooked food items comprising:
   a) depositing the cooked food items onto a food item receiving platform when the platform is in a substantially horizontal food receiving position;
   b) sensing the presence of the food items on the food item receiving platform;
   c) initiating operation of an automated seasoning device in response to receiving a signal of sensed food items on the food item receiving platform when the platform is in a substantially horizontal food receiving position;
   d) depositing a preselected amount of seasoning from the automated seasoning device onto the food items on the food item receiving platform; and
   e) after depositing the amount of seasoning, activating a mechanism to transfer the food items from the food item receiving platform to a food storage bin by raising the platform to an inclined position.

2. The method of processing cooked food items according to claim 1 further comprising directing radiant energy onto the food items in the food storage bin.

3. The method of processing cooked food items according to claim 2 wherein the radiant energy is directed through a selective radiant energy filter, the filter filtering at least a portion of a preselected range of radiant energy wave lengths.

4. The method of processing cooked food items according to claim 3 wherein the filter is capable of filtering at least a portion of the radiant energy in the wavelength range of from about 200 nm to about 380 nm.

5. The method of processing cooked food items according to claim 1 wherein activating the mechanism to transfer the food items causes the mechanism to pivot the platform from a substantially horizontal position to at least a substantially vertical position for dumping the food items in the tray.

6. The method of processing cooked food items according to claim 1 wherein the mechanism to transfer the food items includes a pivotable tray that pivots the tray to at least a substantially vertical position for dumping the food items in the tray.

7. The method of processing cooked food items according to claim 1 wherein after transfer of the food items, infrared heat is directed toward the food items to maintain their temperature at an appropriate temperature, the infrared heat passing through a filter that filters out a preselected range of infrared wavelengths therefrom.

8. The method of processing cooked food items according to claim 1 further comprising delivering the cooked food items in a handheld fry basket to the platform, wherein depositing the cooked food items onto a food item receiving platform comprises removing the cooked food items from the handheld fry basket.

9. The method of processing cooked food items according to claim 1 further comprising delivering the cooked food items in a handheld fry basket to the platform, wherein depositing the cooked food items onto a food item receiving platform comprises hanging a handheld fry basket on a bracket, the bracket responsive to the hanging actuating a release device on the fry basket that releases a catch so as to open the bottom of the fry basket.

10. The method of processing cooked food items according to claim 9, wherein the bracket is at a fixed location vertically above the food item receiving platform.

11. The method of processing cooked food items according to claim 1 wherein the automated seasoning device comprises a hopper having a hopper opening and a rotatable dispensing drum positioned to receive seasoning from the hopper through the hopper opening, wherein depositing a preselected amount of seasoning comprises rotating the dispensing drum to dispense seasoning from the automated seasoning device.

12. The method of processing cooked food items according to claim 11 wherein depositing a preselected amount of seasoning further comprises dispersing the dispensed seasoning.

13. The method of processing cooked food items according to claim 1 further comprising separating waste matter in the food items from the food items in the food storage bin.

14. The method of processing cooked food items according to claim 13 further comprising collecting the separated waste matter.

15. The method of processing cooked food items according to claim 1 further comprising loading an individual package with one or more food items from the food storage bin.

16. The method of processing cooked food items according to claim 15 further comprising placing the loaded individual package in a rack for keeping the loaded individual package upright for service to a customer.

17. An automated method of processing cooked food items comprising:
   a) depositing the cooked food items onto a food item receiving platform;
   b) sensing the presence of the food items on the food item receiving platform;
   c) initiating operation of an automated seasoning device in response to receiving a signal of sensed food items on the food item receiving platform;
   d) depositing a preselected amount of seasoning from the automated seasoning device onto the food items on the food item receiving platform; and
   e) after depositing the amount of seasoning, activating a mechanism to transfer the food items from the food item receiving platform to a food storage bin, wherein the activated mechanism transfers the food items by pivoting and raising the platform to at least a substantially vertical position to transfer the food items from the platform into the bin.

18. An automated method of processing cooked food items cooked in a handheld fry basket, the method comprising:
   a) removing the cooked food items from the handheld fry basket;
   b) depositing the removed cooked food items onto a food item receiving platform;
   c) sensing the presence of the food items on the food item receiving platform;
   d) initiating operation of an automated seasoning device in response to receiving a signal of sensed food items on the food item receiving platform;
   e) depositing a preselected amount of seasoning from the automated seasoning device onto the food items on the food item receiving platform; and
   f) after depositing the amount of seasoning, activating a mechanism to transfer the food items from the food item receiving platform to a food storage bin.

19. The method of processing cooked food items according to claim 18 further comprising delivering the handheld fry basket containing the cooked food items to the platform.

20. The method of processing cooked food items according to claim 18 wherein depositing the cooked food items onto the food item receiving platform comprises hanging the handheld fry basket on a bracket, the bracket responsive to the hanging actuating a release device on the fry basket that releases a catch so as to open the bottom of the fry basket.

* * * * *